Patented Oct. 7, 1941

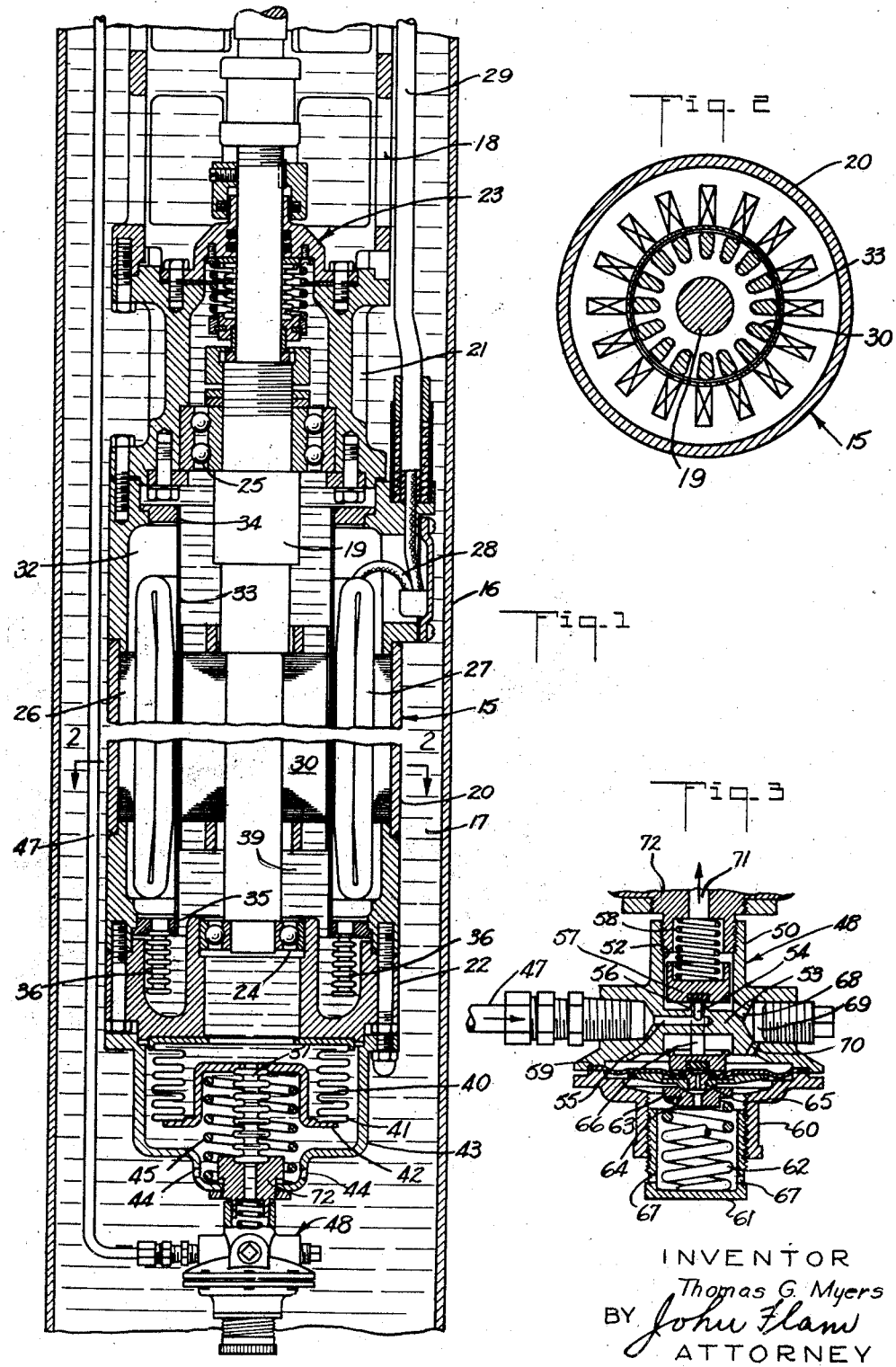

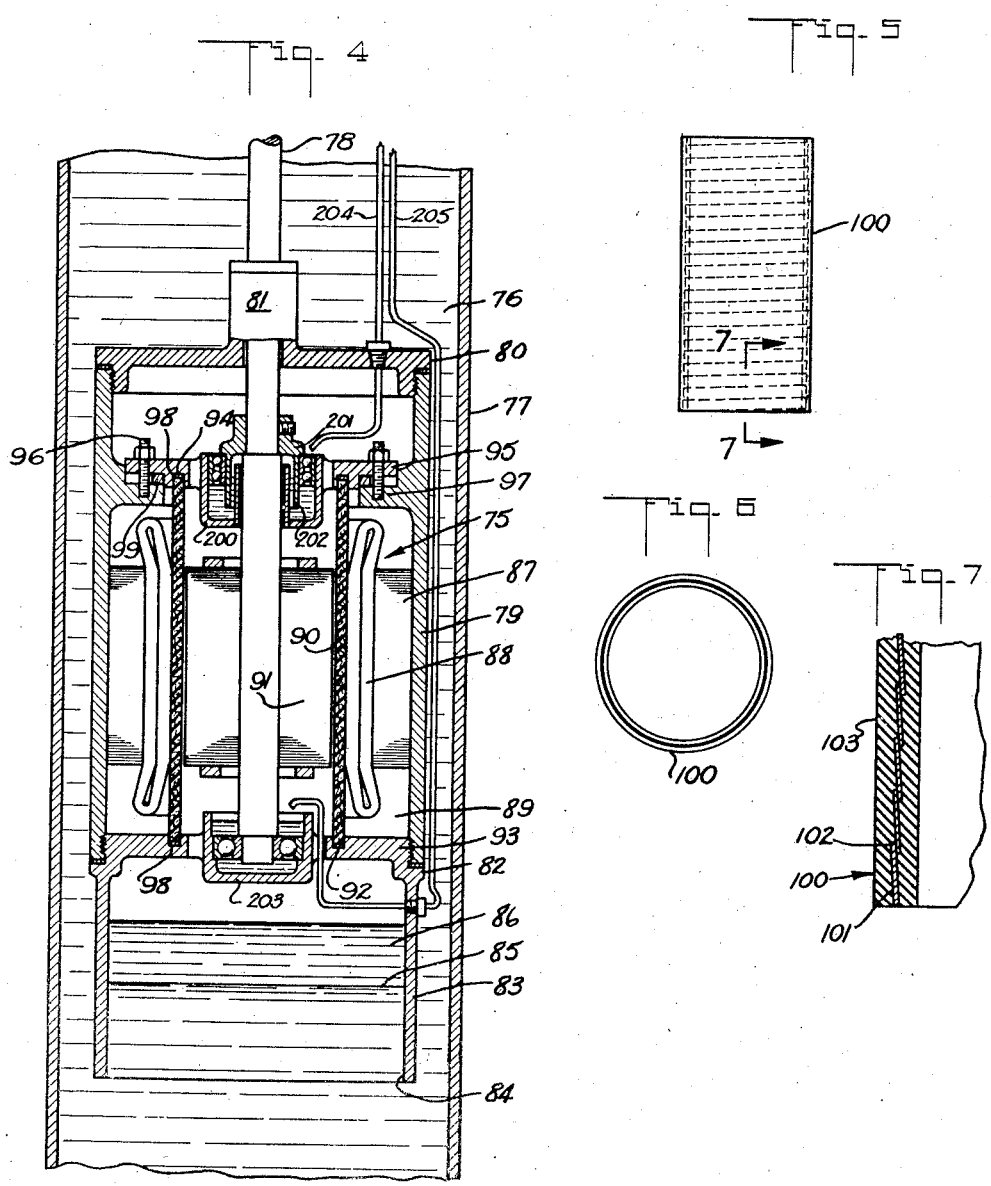

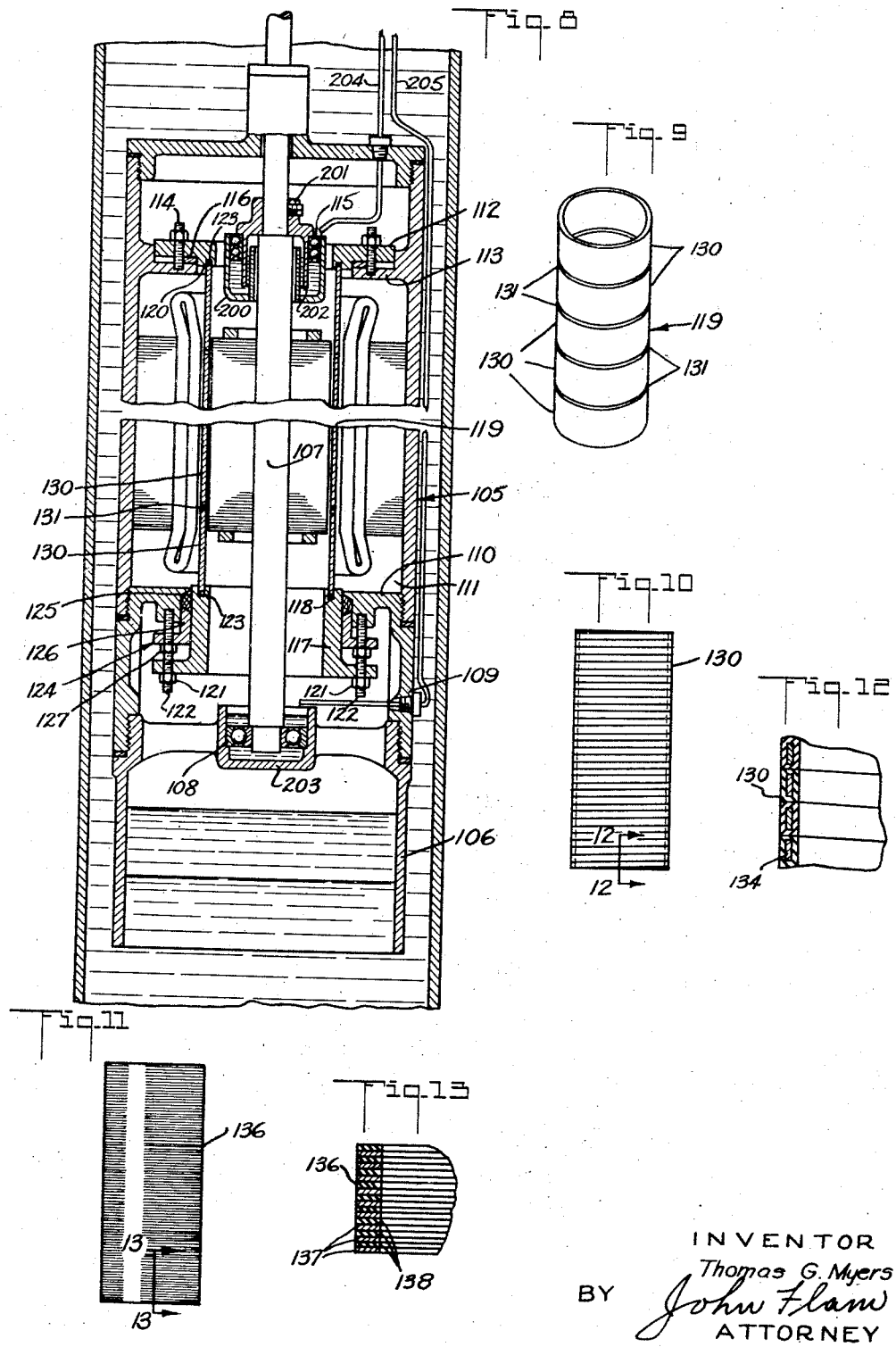

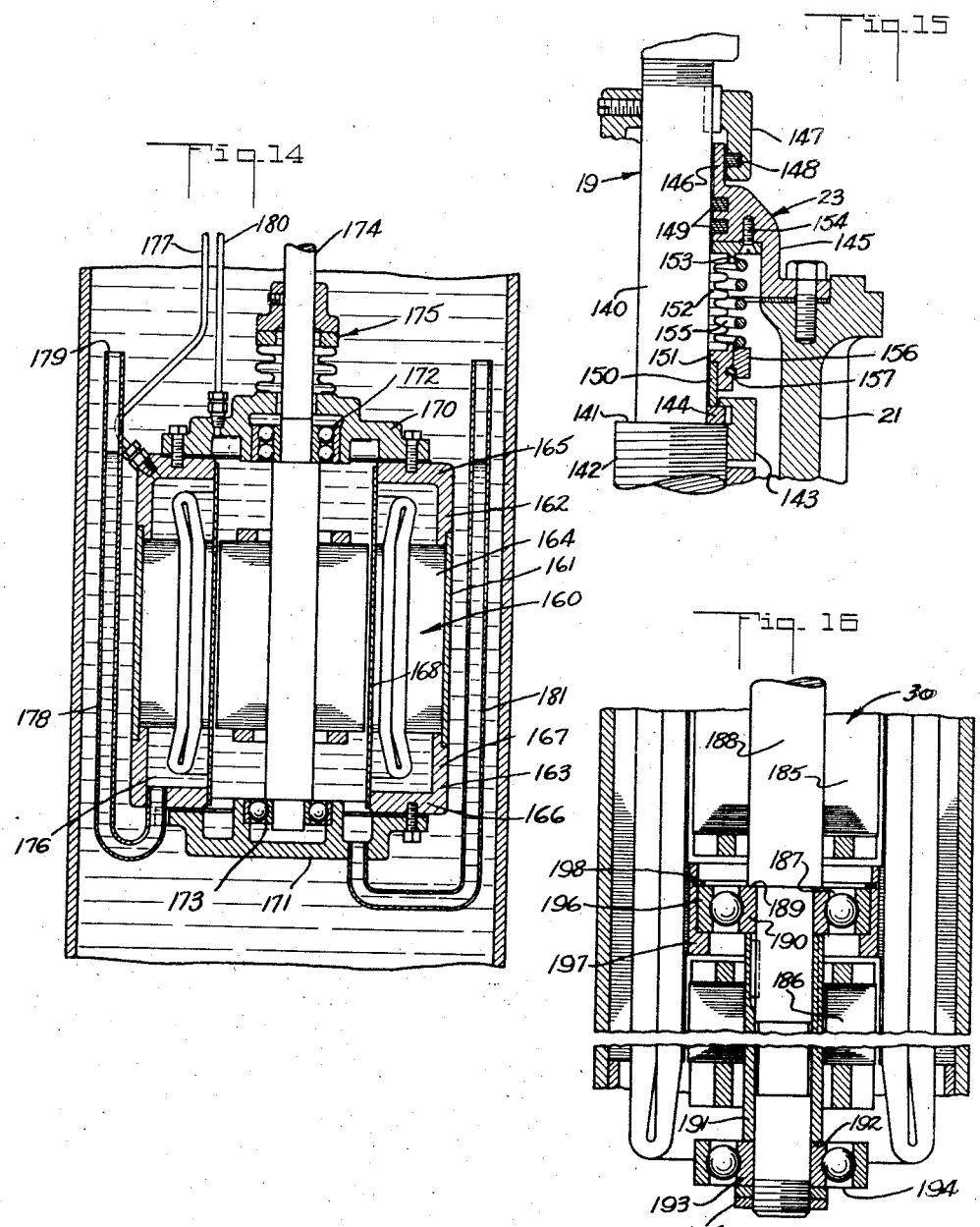

2,258,064

UNITED STATES PATENT OFFICE 2,258,064

SEALED ELECTRIC MOTOR

Thomas G. Myers, Los Angeles, Calif., assignor to U. S. Electrical Motors, Inc., Los Angeles, Calif., a corporation of California Application May 27, 1938, Serial No. 210,407

15 Claims. (Cl. 172—36)

This invention relates to motors which are subjected to fluids or liquids as an incident to their operation and use; for example, motors which operate deep well pumps and are submerged in the well liquid.

The windings and electrical connections, as well as the rotating parts of these motors, must be protected from such fluid, which in the case of a well, is usually water, carrying considerable grit and other foreign matter in suspension.

Such motors may be arranged in a fluid tight casing. It is a comparatively simple matter to make such a casing fluid tight except in the region where the motor shaft extends out of the casing. Various types of seals have been used at this point, some of which are quite successful in excluding liquid from the motor casing; but as a small amount of water can seriously injure the motor, additional safeguards have been sought. Thus it is sometimes the practice to maintain the motor casing filled with neutral lubricating and insulating liquid, such as oil, subjected to a pressure somewhat in excess of that of the liquid surrounding the casing. In this way, any leakage past the seal is outwardly from the casing, and the oil filling remains unimpaired. In spite of this precaution, however, some water may find its way into the casing and form an emulsion with some of the oil. This emulsion may, after a while, damage the windings or other vital parts of the motor.

It is accordingly an object of this invention to provide a motor having improved means for safeguarding the windings from contact with the well liquid, or any other fluid in which the motor is operating.

It is another object of this invention to provide a motor having a wall separating the rotating elements from the armature windings, and forming a fluid tight compartment enclosing these windings.

It is a still further object of this invention to provide a motor in which a neutral liquid is used to exclude the liquid or fluid surrounding the motor casing from the rotating parts and in which the stationary windings are not in contact with this liquid.

It is still another object of this invention to provide an improved type of seal for the motor shaft where it leaves the motor casing.

It is a still further object of this invention to provide a motor, having a rotor which is long compared to its diameter, and having a narrow air gap that is so constructed as to ensure accurate concentric alinement of the rotating parts.

This invention possesses many other advantages, and has other objects which may be made more easily apparent from a consideration of several embodiments of the invention. For this purpose there are shown a few forms in the drawings accompanying and forming part of the present specification. These forms will now be described in detail, illustrating the general principles of the invention; but it is to be understood that this detailed description is not to be taken in a limiting sense, since the scope of the invention is best defined by the appended claims.

Referring to the drawings:

Figure 1 is a transverse section through a motor, installed in a well casing, embodying one form of the invention;

Fig. 2 is a cross section as seen on plane 2—2 of Fig. 1;

Fig. 3 is a transverse section on an enlarged scale of the pressure regulator of Fig. 1;

Fig. 4 is a transverse section through a motor of slightly different detail than that of Fig. 1, embodying a modified form of the invention;

Fig. 5 shows a sealing tube adapted to be used with another form of the invention;

Fig. 6 is a plan view on an enlarged scale of the tube shown in Fig. 5;

Fig. 7 is a fragmentary detail section as seen on plane 7—7 of Fig. 5;

Fig. 8 is a section of a motor similar to Fig. 4, but showing a further modification of the invention;

Figs. 9, 10 and 11 are views illustrating sealing tubes utilized with further modified forms of the invention;

Figs. 12 and 13 are fragmentary detail sections as seen on correspondingly numbered planes of Figs. 10 and 11 respectively;

Fig. 14 is a transverse section through a motor embodying another form of the invention;

Fig. 15 is a fragmentary view showing details of the shaft seal of Fig. 1; and

Fig. 16 is a fragmentary detail on an enlarged scale showing another modification of the invention.

In Figs. 1 and 2 of the drawings, a submersible motor 15 is shown. This motor is within a casing 16 defining a well and filled with well liquid 17 (usually water), extending some distance above the motor. The motor drives a pump (not shown), positioned above it on a frame 18, by means of an upwardly extending shaft 19. The motor 15 includes a casing 20, which is generally cylindrical, and closed in a fluid tight manner at its upper and lower ends by heads 21 and 22.

The upper head 21 is provided with a seal structure 23, to prevent the passage of fluid where shaft 19 passes through the head. This seal structure will be more fully described hereafter.

The shaft 19 is rotatably supported by an anti-friction bearing 24 mounted in the lower head 22, and an anti-friction bearing 25 mounted in the upper head 21. Either or both of these bearing structures may also serve as a thrust bearing. Within the motor casing 20 is secured the usual laminated stator structure 26, carrying the primary windings 27. Current is supplied to these by a cable 28, which extends upwardly from the motor in a water tight conduit 29. The usual squirrel cage rotor 30 is fixed to shaft 19.

Since obviously it is essential to keep the well liquid 17 from reaching the windings 27, means are provided for forming a sealed space or compartment 32 in which they are enclosed. Thus, a thin tube 33 of suitable material, such as stainless steel, which closely fits the bore of the stator, is supported therein by means of upper and lower end members 34 and 35, to which the tube may be welded. These members are secured in fluid tight relation to the upper and lower heads 21 and 22, respectively, in any convenient way, as by welding, and form in effect sub-heads for closing the ends of compartment 32 in a water tight manner.

Since tube 33 is very thin and made from stainless steel, which is substantially non-magnetic, the electrical characteristics of the motor are not materially affected.

Any well liquid which may pass the sealing means 23 will be prevented from reaching the windings 27 and connection 28 which are in this compartment.

It is desirable that the pressure within compartment 32 shall not differ greatly from that within the motor casing 20, thereby avoiding undue strains on tube 33 and the various joints between it and the casing. For this purpose, one or more small metal bellows or Sylphons 36 are attached to the lower sub-head 35, with their interior chambers in communication with the compartment 32. The exterior areas of the Sylphons 36 are subject to the pressure within casing 20. They act by varying the volume of compartment 32 to equalize the interior and exterior pressures.

Since it is difficult to maintain the effectiveness of a seal, as 23, about a rotating shaft, the motor casing 20, except for compartment 32, is preferably filled with a light neutral insulating and lubricating liquid 39, such as oil. This filling in the present instance is maintained at a pressure above that of the well liquid surrounding the casing, whereby any leakage past seal 23 will be outward from casing 20, and whereby well liquid will be prevented from entering the motor. This pressure is obtained by means of a variable volume chamber 40, at the lower end of the casing, which may conveniently consist of a large metal bellows or Sylphon 41 attached to the lower head 22 in a fluid tight manner and having a head 42. The chamber 40 is enclosed within a housing or cap 43, also attached to the lower head 22, and provided with ports 44, whereby the pressure of the well liquid is effective on the outside of bellows 41, urging it to collapse. Supplementing this pressure, is the pressure of a spring 45 which is confined in oppositely facing recesses formed in head 42 and cap 43. This arrangement will maintain the pressure in the casing substantially above that outside of the casing as a result of the force exerted by the spring 45.

The neutral liquid may be supplied to the casing by means of a tube 47 which leads from a suitable source of supply (not shown) at the top of the well through a pressure regulating valve 48 to the bottom of the casing.

This valve forms no part of the present invention. Any valve of this general type may be used if desired. However, the valve 48 as shown includes a body 50 appropriately supported by cap 43. The interior 52 of the body is in communication with the interior of expansion chamber 40 by means of a flexible tube 51, which may conveniently be a small diameter Sylphon.

The interior 52 of the body 50 is spanned by a well 53, having a valve port 54 in its upper side in communication with the pipe 47 by way of the transverse port 55. The valve port 54 is surrounded by a valve seat 56 against which a valve closure 57 is urged by compression spring 58. A flexible metal or rubber diaphragm 59 is secured to the lower part of the body by a cap 60 having threadedly engaged therein a cup 61.

Cup 61 adjustably supports a compression spring 62 which engages the under side of diaphragm 59 by means of a self-alining washer 63. The pressure of the spring on the diaphragm is supplemented by the pressure of the well liquid, this liquid being free to act on the under side of the diaphragm by means of ports 67 in cap 61. The diaphragm 59 carries a ported valve seat 64 with which a valve closure 65 cooperates. Pusher posts 66 operatively connect the valve closures 57 and 65, these posts passing freely through wall 53. The pressure within casing 20 and valve body 50 is effective on the upper side of diaphragm 59 via ports 68, 69 and 70, within the body 50; and by way of port 71 that extends through the cap closure 72. When this pressure falls below the point for which the parts of the regulator are proportioned and set, the combined pressure of spring 62 and the well liquid force the diaphragm upwardly, together with valve closure 65, pusher posts 66 and valve closure 57, against the force of spring 58. When the pressure rises sufficiently, the diaphragm is forced back and valve closure 57 seats. If now, the pressure continues to rise for any cause, upon reaching a predetermined figure it will force diaphragm 59, together with valve seat 64, further downwardly against the pressure of spring 62 and of the well liquid. Valve closure 65, however, cannot follow the seat 64 because it is attached to valve closure 57 by the posts 66. Thus the port through seat 64 is opened and the excess liquid from the casing escapes through it and ports 67 into the well. When the pressure reaches normal, the diaphragm rises and brings seat 64 against closure 65, which stops the escape of liquid.

Referring to the details of the seal structure 23, these are best shown in Fig. 15. A feature of the design is that the diameters of all rubbing parts are maintained as small as possible, thus keeping the peripheral speed low. This is of especial importance with larger motors.

That portion 140 of shaft 19 which extends through head 21 is of reduced diameter, and terminates in a shoulder 141. That portion of shaft 19 immediately below the shoulder is provided with screw threads 142 which are engaged by a collar nut 143, thus serving to clamp a ring 144 on the shaft so as to rotate therewith. A bonnet or cap 145 is secured to the top of head 21 and has an upwardly projecting hub or boss 145, the outer surface of which is closely engaged by the inner surface of an inverted cup 147 which is secured to the shaft. A ring 148 of resilient packing material such as rubber or felt, is disposed in a suitable groove in cup 147 so as to seal the space between the inner surface of the cup 147 and the outer surface of hub 146. A pair of rings 149 of similar material are disposed in annular grooves formed in cap 145 and bear against the reduced portion 140 of the shaft.

An additional seal is provided by a stationary collar 150 which bears against the ring 144. Collar 150 is secured in any convenient manner, as by a press fit, within a member 151 attached to the lower end of a metal bellows or Sylphon 152. The upper end of the Sylphon is attached to a flange 153, which is held in a suitable recess in cap 145, as by screws 154. Collar 150 is urged into engagement with ring 144 by a spring 155 which is confined between the flange 153 and a ring 156 encircling member 151 and connected thereto by a snap ring 157. The contacting sealing members 144 and 150 may be made from appropriate material that retains its sealing qualities even after extended use. By aid of the described construction, all surfaces in rubbing contact are maintained at the smallest possible diameters.

The bellows 152, in conjunction with ring 144 carried by shaft 19, effectively separate the interior of casing 15 from the upper end of shaft 19 that projects through the cap 145.

It is not necessary that there be an oil filling in the casing. Thus, in Fig. 4 a simplified form of motor is illustrated in which the oil filling is dispensed with and the rotating parts operate in air. In this form, the motor 75 is submerged in well liquid 76, casing 77 defining the well, and is arranged to drive a pump (not shown) by the upwardly extending shaft 78 similar to the first form. The motor 75 is housed within a casing 79, closed at its upper end by a head 80 carrying a seal 81 where the shaft passes through the head, and having a member 82 secured to its lower end with a skirt 83 and open at the bottom 84. When the motor is lowered in the well liquid, air is trapped in the casing and compressed as the liquid rises in the casing, until the pressure within and without the casing are equalized. Obviously, if the length of the casing 79 and skirt 83 is proportioned correctly with regard to the depth to which the motor will be submerged, the surface 85 of the liquid in the casing will be maintained below the motor by the trapped air in the casing. A layer 86 of oil or other suitable material may be placed on the surface 85 to prevent absorption of the air in the casing by the liquid.

The motor 75 includes the usual laminated stator structure 87, secured in casing 79 and carrying the primary windings 88. Since it is vital to the continued operation of the motor that these windings be protected from moisture, means are provided forming a fluid tight compartment 89 within the casing 79 and which encloses the stator structure. This compartment is defined by a tube 90 which fits the bore of the stator 87 and within which the rotor 91, attached to shaft 78, revolves. This tube is supported at its lower end in an annular groove 92 formed in a web wall 93 extending across the top of extension member 82. The upper end of the tube is engaged by a similar groove 94 formed in spider 95 which is attached, as by studs 96, to a flange 97 in casing 79. By tightening the nuts on studs 96, tube 91 may be clamped between spider 95 and wall 93. A packing ring or gasket 98 is placed in each of the annular grooves to make a tight joint between the bottom of the groove and the end of tube 90. To make a fluid tight joint between spider 95 and flange 97, a gasket 99 is placed between them. This gasket may be somewhat thicker and of more resilient material than gaskets 98. In this way it is possible to clamp spider 95 so as to make a fluid tight joint at each end of tube 90 as well as between the spider 95 and its supporting flange 97.

The tube 90 may be of any suitable material. It may be of thin, substantially non-magnetic metal as in the first form, or it may be desirable to make it of some composition which will reduce the eddy current losses. Thus the tube 90 may be made by molding a mixture of "Bakelite" and iron filings, or hard or soft rubber could be used instead of "Bakelite" with iron filings. With this type of tube, the stator slots can be open to facilitate insertion of the coils comprising winding 88. When the tube is put in the air gap, it acts as a slot closer, giving almost the same effect as a semi-closed slot stator.

Still another form of tube 100 is shown in Figs. 5, 6 and 7. Here a strip of stainless steel 101, which may be of the order of .008" thickness, is spirally wound to form a cylinder of the desired size, the edges of the strip overlapping as at 102. Insulating compound, such as Bakelite, 103 is then placed or molded over this overlapped structure, making a tube which can be placed in motor 75 in the same way as tube 90. The spiral winding serves to interrupt the continuity of a conducting path for eddy currents, which may otherwise be induced by the winding 88.

Other types of tubes may be used to close the stator compartment. Fig. 8 shows a motor 105, similar to that of Fig. 4, with certain modifications to facilitate the use of other types of tubes than those previously disclosed. This motor is shown as having an air filled casing with a skirt member 106 open at the bottom in which the well liquid rises and arranged to support the lower end of the motor shaft 107 by a bearing 108 as before. It will of course be understood that either of these motors may be arranged to have the rotor run in oil, as in the first form.

An intermediate collar member 109 is threadedly secured to the lower end of the motor casing and has the skirt member 106 threadedly secured to its lower end. Member 109 has an inwardly extending ring or flange 110 around its upper edge. This forms the lower wall of compartment 111 which houses the stator. The upper wall of this compartment is formed by a plate or spider 112 secured to a flange 113 in the motor, as by studs 114. This spider carries a bearing 115 for motor shaft 107. A gasket 116 between the spider 112 and the flange 113 is provided as before, but need only be of ordinary thickness, since it serves for the sole purpose of making the joint fluid tight.

A sleeve 117 coaxial with shaft 107 is slidable through ring 110 and has a groove 118 to receive the lower end of the tube 119. A similar groove 120 in spider 112 receives the upper end of the tube. Sleeve 117 is adapted to be forced upwardly in an axial direction by means of nuts 121 on studs 122 in ring 110. Gaskets 123 are provided in the upper and lower groove. The arrangement is such that when the sleeve is forced upwardly, it exerts an axial compressive force on the tube, and the space between the ends of the tube and the adjoining surface is rendered fluid tight by the gaskets 123. To permit the sleeve 117 to slide in ring 110 in a fluid tight manner, a conventional stuffing box 124 is formed on the ring. This includes a space 125 surrounding the sleeve 117 filled with packing, a gland 126 serving to compress the packing against the sleeve in response to upward movement caused by tightening nuts 127 on studs 122.

This arrangement might be used instead of that described for mounting tubes of the type described in Figs. 4 and 5, but since little relative axial movement between the heads is required to render this type of tube fluid tight at the ends, the simpler arrangement shown in Fig. 4 is satisfactory.

The tube 119 shown in Figs. 8 and 9, is made up of a number of short, thin walled cylinders 130 of some suitable metal, such as stainless steel, stacked one upon the other and closely fitting the bore of the stator. A thin layer 131 of resilient insulating material, such as rubber, is placed between adjoining cylinders, whereby upon the application of axial pressure, the joints are rendered fluid tight. The insulating quality of these joints also reduces the eddy current losses.

As shown in Figs. 10 and 12, the tube 130 which is for the same purpose as tube 119, may consist simply of a coil of insulated wire of suitable material 134, closely wound, and of rectangular section. The insulation must be of some resilient material, as rubber, so that the application of axial force, as by sleeve 117, will cause the coil to assume the water tight characteristics of a tube.

Another type of tube is shown in Figs. 11 and 13. In this form the tube 136 is made up of a stack of thin rings 137 and 138, alternately metal and resilient insulation. The metal rings may be of mild steel or similar material, such as that from which the stator and rotor laminations are punched. It will be plain that the application of sufficient axial pressure will render this stack fluid tight. Of course, the insulation between rings may be provided as for ordinary laminated structures, as by spraying the laminations, or simply by utilizing the scale formed thereon.

It will be understood that either the coil or the rings just described will have an outside diameter approximately equal to the rotor bore, so that it will fit the bore snugly, and further that the width of the rings, or the diameter of the wire be comparatively small, so that the air gap in the motor may be narrow. Tubes constructed in either of these ways will also effectively reduce the eddy current losses.

If desired, pressure equalizing means, whereby the pressure within the stator compartment is maintained substantially equal at all times to the pressure prevailing in the rest of the motor casing, such as shown in Fig. 1, may be installed in the motors shown in Figs. 4 and 8.

It may be desirable to fill the compartment which houses the stator structure, with a heavy insulating liquid, as a further precaution against entry of well liquid. A motor 160 incorporating this feature is shown in Fig. 14.

This motor 160 includes a casing formed of a central cylindrical member 161, to which are attached, as by welding, upper and lower heads 162 and 163 which clamp the stator laminations 164 between them, and have inwardly extending annular flanges 165 and 166 forming the end walls of the stator compartment 167. A thin metal tube 168, which may be stainless steel, extends through the stator bore between the end flanges 165 and 166, and its ends are respectively joined to these as by welding, completing the compartment 167.

Upper and lower caps 170 and 171 are secured in a fluid tight manner respectively to heads 162 and 163, and provide supports for the rotor shaft bearings 172 and 173. The rotor shaft 174 extends upwardly through the top cap 170 for connection to a pump in a well understood manner. A seal 175, of any preferred form, is provided at the place where shaft 174 passes through cap 170, for the purpose of excluding well liquid from the rotor compartment.

While the stator compartment 167 is formed in a fluid tight manner, it is shown as provided with a filling 176 of an inert, insulating liquid, which is heavier than water but not necessarily a lubricant. Carbon tetrachloride is such a liquid. It may be supplied to the motor by a pipe 177 extending from a suitable source at the top of the well. A balance tube 178 extends upwardly from the bottom of the motor to a point somewhat above its top, the upper end 179 of the tube being open to the well liquid. This serves to equalize the fluid pressures within and without compartment 167. Obviously, the stator compartments in the previously described types of motors could be similarly provided with liquid if desired. The rotor of the motor of Fig. 14 may be operated in air or light neutral liquid as in the previous types. As shown in that figure, however, means are provided for the rotor to run in an inert, insulating liquid, which is heavier than water and which will lubricate the bearings. Such a liquid may be either carbon disulphide, or "Pyranol," or the like. The liquid is supplied to the rotor compartment by a tube leading from a suitable source at the top of the well. A balance tube 181, similar to the one used with the stator compartment, is provided to equalize the pressure in the rotor compartment with the well liquid pressure.

Since the diameter of a submerged motor must be less than that of the casing of the well in which it is to be used, and this is generally small, of the order of 8 inches or even less, the motor must be long to obtain the requisite power. When a long rotor is used, a wide air gap is required to prevent the rotor striking the stator as it rotates, due to manufacturing tolerances, shaft whip, bearing wear, or other causes. This wide air gap results in lowered motor efficiency.

By the addition of a bearing intermediate the ends of the rotor, it is possible to combine the use of a long rotor and a standard width air gap, with assurance that the rotor will remain properly centralized. Fig. 16 shows such a bearing applied to a motor similar to that disclosed in Fig. 1, the tube 33, however, being omitted and the length of the motor parts being very materially reduced in order to save space. The rotor 38 is divided into upper and lower portions 185 and 186, with a space between them to accommodate the additional bearing structure 187, which is preferably of the anti-friction type.

The rotor shaft 188 has its lower portion reduced in diameter so as to form a shoulder 189 positioned just below the upper rotor 185. The inner race 190 of bearing 187 is clamped against this shoulder by a tube or sleeve 191 which slips over the reduced portion of the shaft. The lower end of sleeve 191 forms a shoulder 192 against which the inner race 193 of the lower bearing 194 is clamped, as by a nut 195.

The outer race 196 of bearing 187 is mounted in a cage or retainer 197, a split resilient ring 198 serving to hold it in place. The outside diameter of cage 197 must be greater than the diameter of the rotor, to permit the rotor to pass through the opening in which the cage is mounted, and at the same time it must be less than the inside diameter of the stator to permit a fit between the cage and the stator at the place where it is supported.

That part of the stator which forms the support for the cage is made of laminations instead of solid material to cut down eddy current losses. Further, these laminations are made of non-magnetic material, such as stainless steel, since there is no rotor beneath them, and as little magnetic flux as possible is wanted, to avoid setting up currents in the bearing and to reduce leakage reactance.

If the motor casing is filled with lubricating liquid, as in the forms of the invention illustrated in Figs. 1 and 14, the bearings which support the rotor shaft are of course properly lubricated. If the casing is air or gas filled, however, as in Figs. 4 and 8, some means must be provided to insure lubrication of these bearings. Thus in these figures, the upper bearing is shown as supported on the outer wall of an annular ring or well 200, the shaft being supported by an inverted cup 201 which engages the bearing. This well may be arranged to be filled with lubricant in any convenient way, as for example, by a tube 204 extending to the top of the well.

The cup 201 has a skirt 202 which picks up the oil and distributes it to the bearing. The lower bearing may run submerged in oil retained by a well 203 formed in the lower casing wall. This well may be supplied with oil by another tube 205 which also extends to the top of the well.

What is claimed is:

1. In an electric motor adapted to be submerged in well liquid and having a stator and a rotor, a wall interposed between the stator and rotor and sealing the stator, sealing means for the space in which the rotor is accommodated, said means being capable of withstanding the pressure of the well liquid and a neutral liquid filling for the rotor space.

2. A motor comprising a casing, a stator structure mounted in the casing, a rotor rotatably supported in operative relation to the stator, and means forming a fluid tight compartment within the casing enclosing the stator, said means including a tube positioned in the air gap between the stator and the rotor, said tube being formed of a spirally wound metallic ribbon, and an insulating compound.

3. A motor comprising a casing, a stator structure mounted in the casing, a rotor rotatably supported in operative relation to the stator, and means forming a fluid tight compartment within the casing enclosing the stator, said means including a tube positioned in the air gap between the stator and the rotor, said tube being formed of a plurality of thin metallic cylinders, separated by layers of insulation.

4. A motor comprising a casing, a stator structure mounted in the casing, a rotor rotatably supported in operative relation to the stator, and means forming a fluid tight compartment within the casing enclosing the stator, said means including a tube positioned in the air gap between the stator and the rotor, said tube being formed of a stack of alternate metallic laminations and layers of insulation.

5. A motor comprising a casing, a stator structure mounted in the casing, a rotor rotatably supported in operative relation to the stator, means forming heads, secured to the casing adjacent each end of the stator, means forming a tube extending through the bore of the stator and joined to the heads, and means associated with the heads for exerting an axial compressive force on the tube, said means comprising an axially adjustable member carried by one of the heads and engaging an end of the tube.

6. In a motor adapted to be submerged in well liquid, a casing, a stator, a rotor, means forming a fluid tight compartment within the casing enclosing the stator, and a filling of non-lubricating insulating liquid in the compartment, said liquid being heavier than the well liquid.

7. In a motor adapted to be submerged in well liquid including a casing, a stator, a rotor, and a shaft extending out of the casing, means forming a fluid tight compartment enclosing the stator in the casing, the rotor being in the casing and outside the compartment, sealing means disposed between the casing and the shaft for excluding the well liquid from around the rotor, and a body of fluid lighter than the well liquid surrounding the rotor.

8. In a motor adapted to be submerged in well liquid, a casing sealed against entry of said liquid, means dividing said casing into fluid tight compartments, one of which encloses the stator, the rotor being in the other compartment, and a filling in the latter compartment of an insulating and lubricating liquid which is heavier than the well liquid.

9. In an electric motor adapted to be submerged in well liquid, a casing, a stator structure mounted in the casing, a rotor rotatably supported in operative relation to the stator and having a shaft extending out of the casing, a wall interposed between the stator and the rotor and forming a fluid tight compartment within the casing enclosing the stator as well as a space in which the rotor is mounted, a filling of insulating liquid in the stator compartment, said liquid being heavier than the well liquid, and a filling of insulating and lubricating liquid in the rotor space.

10. In an electric motor adapted to be submerged in well liquid, a casing, a stator structure mounted in the casing, a rotor rotatably supported in operative relation to the stator and having a shaft extending out of the casing, a wall interposed between the stator and the rotor and forming a fluid tight compartment within the casing enclosing the stator as well as a space in which the rotor is mounted, a filling of insulating liquid in the stator compartment, said liquid being heavier than the well liquid, a filling of insulating and lubricating liquid in the rotor space, sealing means surrounding the shaft adapted to seal between the casing and the shaft and capable of withstanding the pressure of the well liquid, and means to equalize the pressures within the compartment and within said space with the pressure surrounding the casing.

11. In an electric motor adapted to be submerged in well liquid, a casing, a stator structure mounted in the casing, a rotor rotatably supported in operative relation to the stator and having a shaft extending out of the casing, a wall interposed between the stator and the rotor and forming a fluid tight compartment within the casing enclosing the stator as well as a space in which the rotor is mounted, a filling of lubricating and insulating liquid in the rotor space, means to maintain the pressure in said space above the pressure surrounding the casing, and sealing means surrounding the shaft adapted to seal between the casing and the shaft and capable of withstanding the pressure of said liquid filling.

12. The structure set out in claim 11 with the addition of means to equalize substantially the pressure within the compartment and the pressure within the space.

13. In an electric motor adapted to be submerged in well liquid, a casing, a stator structure mounted in the casing, a rotor rotatably supported in operative relation to the stator and having a shaft extending out of the casing, a wall interposed between the stator and the rotor and forming a fluid tight compartment within the casing enclosing the stator as well as a space in which the rotor is mounted, a filling of insulating and lubricating liquid in said space, and means to equalize the pressure in said space with the pressure in the compartment.

14. In an electric motor adapted to be submerged in well liquid, a casing, a stator structure mounted in the casing, a rotor rotatably supported in operative relation to the stator and having a shaft extending out of the casing, a wall interposed between the stator and the rotor and forming a fluid tight compartment within the casing enclosing the stator as well as a space in which the rotor is mounted, sealing means surrounding the shaft adapted to seal between the casing and the shaft and capable of withstanding the pressure of the well liquid, whereby well liquid is excluded from the space in which the rotor is accommodated, a filling of insulating and lubricating liquid in said space, and means to equalize the pressure in said space with the pressure in said compartment.

15. A submersible motor comprising a casing, a stator structure mounted in the casing, a rotor supported on a shaft in operative relation to the stator, said shaft being rotatably supported in the casing and extending out of the casing, means secured to the casing adjacent each end of the stator structure forming a head, the shaft extending through one of said heads, means extending through the bore of the stator and connected to the heads forming a fluid tight compartment enclosing the stator structure and defining a space in which the rotor operates, and a sealing device carried by said one head and adapted to seal about the shaft to prevent entry of well liquid into said space.

THOMAS G. MYERS.